Figure 16:
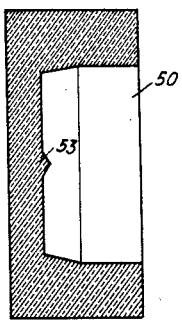

Jan. 15, 1935.  T. D. PARKIN  1,987,969
PROCESS FOR THE MANUFACTURE OF HIGH RESISTANCES
Filed May 5, 1928  2 Sheets-Sheet 1
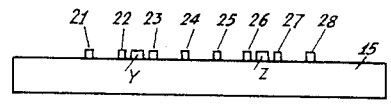
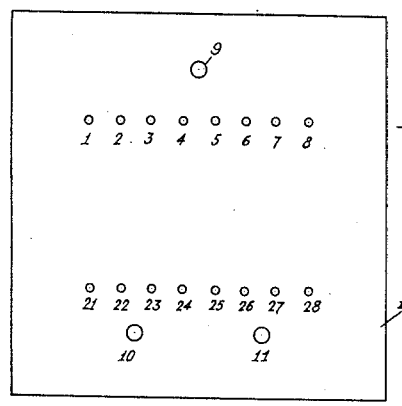
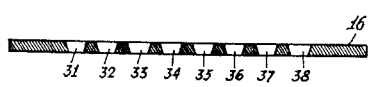
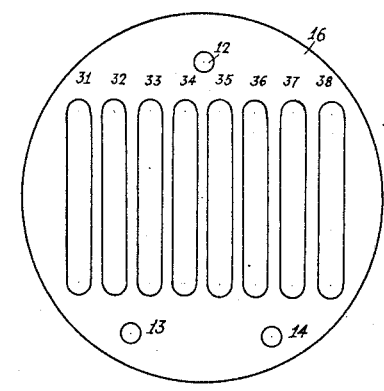
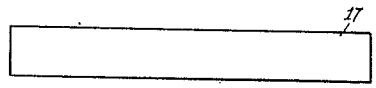
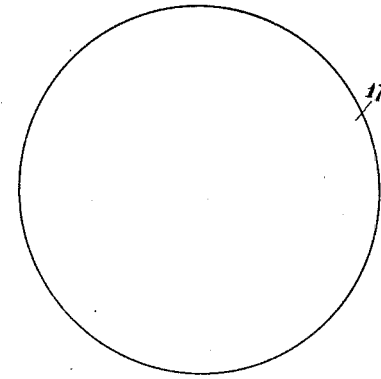
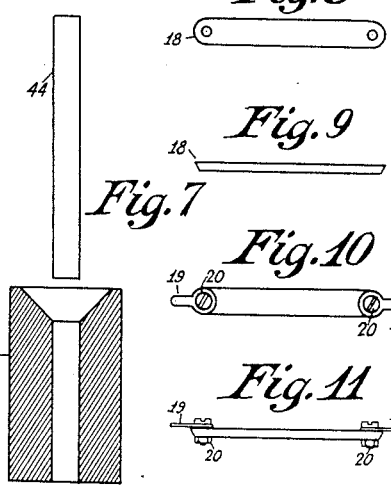
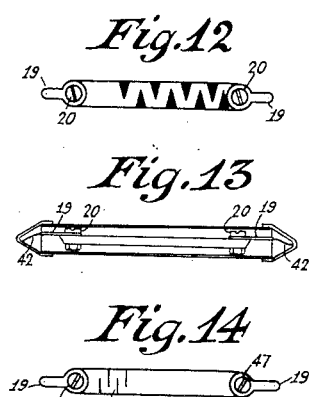
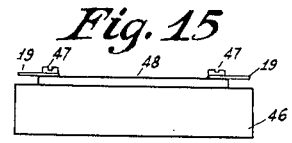
INVENTOR
THOMAS D. PARKIN
BY
ATTORNEY Jan. 15, 1935.   T. D. PARKIN   1,987,969
PROCESS FOR THE MANUFACTURE OF HIGH RESISTANCES
Filed May 5, 1928   2 Sheets-Sheet 2

INVENTOR
THOMAS D PARKIN
BY Ira J Adams
ATTORNEY

Patented Jan. 15, 1935

1,987,969

UNITED STATES PATENT OFFICE 1,987,969

PROCESS FOR THE MANUFACTURE OF HIGH RESISTANCES

Thomas Dixon Parkin, Broomfield, near Chelmsford, England, assignor to Radio Corporation of America, a corporation of Delaware Application May 5, 1928, Serial No. 275,407
In Great Britain May 13, 1927

3 Claims. (Cl. 201—76)

This invention relates to high resistances and processes for the manufacture thereof, and has for its object to provide a high resistance which shall be cheap to manufacture, easy to adjust, of small dimensions and of substantially constant value.

According to this invention a high resistance is manufactured by forming a moulding of insulating material and printing or otherwise affixing thereon under pressure, one or more films or thin layers of conductive material.

Other advantages to be gained by the use of my process will become apparent in part from the following specification, and in part therefrom when read in connection with the accompanying drawings in which:

Figures 1 to 6 inclusive illustrate the apparatus used for moulding a plurality of high resistances, Figure 7 shows the apparatus used in forming blanks to be moulded into resistances, Figures 8 to 15 inclusive illustrate various stages in the manufacture of said resistances, Figures 16 to 22 inclusive illustrate apparatus employed in manufacturing another construction of high resistance and, Figures 23 to 26 inclusive show the modified form of resistance and the apparatus for the utilization thereof.

Referring first to Figures 1 to 6 of the drawings these illustrate a convenient form of metal mould for making a plurality of high resistances. This mould comprises three parts; a base piece 15 shown in elevation and plan respectively in Figures 1 and 2; a middlepiece 16 shown in sectional elevation and plan respectively in Figures 3 and 4; a top piece 17 shown in elevation and plan respectively in Figures 5 and 6.

The base piece is provided with a plurality of, say, three upstanding locating pins 9, 10, 11, and a plurality of smaller pins 1 21, 2 22, 3 23, 4 24, 5 25, 6 26, 7 27, 8 28. The smaller pins 1 21 etc. may be parallel-sided as shown, but are preferably tapered or conical to facilitate subsequent separation of the base and middle pieces.

The middle piece is drilled at 12, 13, 14, with holes positioned corresponding to the pins 9, 10, 11 of the base piece and adapted, in co-operation with the said pins, to locate the middle piece over the said base piece. The middle piece is also provided with slots 31, 32, 33, 34, 35, 36, 37, 38, so positioned that when the mould is assembled the pins 1 21 will be disposed each substantially centrally at opposed ends of the slot 31, the pins 2 22 centrally at opposite ends of the slot 32, and so on. The top piece 17 is a planar plate with a highly polished under surface.

The resistances comprise an insulating powder capable of being moulded under heat and/or pressure, such as one of the phenol-formaldehyde condensation products, and a finely divided conductor whose particles are so fine as to be capable of suspension in a suitable liquid. A very suitable conductor is the finely divided graphite known as "Dag". This is of extreme fineness and can be held in suspension in water, oil and other liquids. Silver deposited by chemical means (as in known processes of mirror manufacture); platinum deposited by heat from platinum tetrachloride; paper coated upon one side with a deposited metal (such as is employed in the construction of the well known "Mansbridge" condenser); or any finely divided metallic or nonmetallic conductor capable of being brushed, sprayed or chemically deposited upon a vehicle, such as a metallic or nonmetallic plate without uniting with the said vehicle, may be employed as conductor.

The process of manufacturing the resistance may be effected in the following manner:—

The top piece of the mould is covered on its underside with a coating of the conductor, by brushing or (preferably) by spraying or in any other suitable manner. When "Dag", in colloidal suspension in water or other suitable liquid, is employed as the conductor, it may be either brushed or sprayed on the underside of the top plate.

In the case of brushing, it is preferable to apply the coating with the top plate cold, for then the liquid can be allowed to flow upon the plate and a fairly even coating will result. If spraying is resorted to, it is preferable to raise the top plate to a temperature above the boiling point of the liquid used, for then the liquid carrying the "Dag" will evaporate as soon as it strikes the plate and a very even deposit will result.

If silver is used as the conductor, it is preferable to deposit it upon a body such as mica, silica, a suitable glass or other substance with which the silver will not unite. Mica is preferred for this work, since it is comparatively not brittle. The deposit may be made by any of the well known methods employed in the manufacture of mirrors, as, for example, by utilizing an ammoniacal silver nitrate bath with a reducing agent, such as formaldehyde or sugar. The sheet, after silvering, is backed with a metal plate and forms the top plate of the mould, the silvered surface of the mica being, of course, upon the under surface.

Platinum may be employed as the conductor, by painting a body, such as mica, silica, or glass, with platinum tetrachloride in aqueous solution, allowing it to dry, and heating it to drive off the chlorine, when a coating of platinum will be left on the face of the body treated. In this case also the platinized material is backed by a metal plate to form the top plate of the mould.

If paper, having one side coated with a metal (such as is employed in Mansbridge condensers), is employed as conductor, the untreated paper surface is fastened to the top plate of the mould so that the metallized surface forms the under surface of the top plate.

The middle piece of the mould is fitted in position over the base piece and the two pieces placed on the lower plate of a hot press.

The press and lower mould pieces having been brought to a suitable temperature, the powdered insulator is scattered over the middle piece, the top piece is placed in position and pressure applied.

After due time, pressure is removed from the mould, the top piece of the mould removed and the middle piece lifted from the pins on the base piece. It will be found that the slots in the centre mould piece are each filled with a small moulding 18.

These mouldings can then be easily pushed out and will be found to have the shape shown in Figures 8 and 9 of the drawings.

The result of the pressing operation is to print upon the surfaces of the mouldings adjacent the top piece of the mould a conducting film or layer, the other surfaces of the mouldings being insulating.

It is found that when a phenol-formaldehyde condensation product is used, the mouldings, when withdrawn from the mould, are frequently not in final stable form, and it is therefore advisable to "age" the mouldings, i. e. to bring them to their final form by heating for a few hours at a suitable temperature. This temperature must not be high enough to blister the mouldings. This ageing process is generally accompanied by a shrinkage in size, and a lessening of resistance of the conductive film which latter effect is believed due to the said conducting film becoming more dense, owing to the contraction of the moulded body.

The final heating having been accomplished, metal ends 19 may be fitted to the conducting film by means of small screws and nuts 20, as shown in Figures 10 and 11 of the drawings, or in any other convenient manner.

If the mouldings have been made in a mould whose base piece is provided with tapered or conical small pins 1 21, 2 22, etc., it will, of course, be necessary to drill the said mouldings to receive the screws and nuts K.

The value of the resistance may now be adjusted, either by scraping away the conducting face, or by filing small slots 30 in the conducting face from the opposite edges of the strip, as shown in Figure 12 of the drawings.

A further, and preferred method, whereby the value of resistance may be altered or adjusted, is to make small scratches 40 with a sharp tool, such as a scriber, on the conducting surface of the moulding, and from opposite edges of the strip, as shown in Figure 14 of the accompanying drawings (only a few scratches are shown in this figure).

It has been found that when "Dag" is employed as conductor, the resistance of the moulding can be widely varied by altering the temperature at which the top plate is applied, and the speed and pressure with which the top plate is driven home by the press.

Within limits it is found that if the top plate is at a low temperature, the resistance will be high, while if the pressure is low and the rate of feed of the press is slow, the resistance is again high.

The resistance having been adjusted, it is preferably treated with an air-drying varnish to exclude moisture and avoid consequent variation, and may then be utilized in unprotected form, or alternatively, it may be mounted in any suitable protecting covering, such as an insulating tube B with metal ends, as shown in Figure 13 of the drawings, wires 42 being taken from the metal ends to end caps on the tube and soldered thereto.

In a modified and preferred method of manufacturing resistances in accordance with this invention, instead of scattering powdered insulator over the middle piece of the mould when in the press, the said insulator is first made into blanks which are fitted into the slots in the middle mould piece.

A convenient method of making the blanks is as follows:—

A short hollow cylinder, such as that shown at 43, Figure 7 of the drawings is filled with the powdered insulator and rammed tight. A ram 44 is then driven right through the cylinder and the blank in the form of a short cylinder is forced out.

Obviously, if desired, more than one face of the moulding may be made conducting. Indeed, all the surfaces may be made conducting, although, for the purpose of adjustment, it is desirable to leave the edges non-conducting.

If the two main surfaces are to be conducting, then obviously not only the top plate but the bottom plate of the mould also should be treated with the conducting medium.

The adjustment of a resistance of this kind may be effected by fastening the moulding by screws to some insulating body, and making slots or scratches (as previously described) in the exposed surfaces. The desired resistance having been attained, the moulding is removed from the insulator, turned over, re-secured, and the other side adjusted. The method of securing the strip to the insulator is shown in Figure 15 of the accompanying drawings, in which 18 is the moulding, 46 the insulating body, and 47 the securing screws. The arrow 48 indicates the face to be adjusted.

Both sides having been adjusted, a bolt, nut and tab is secured to each end of the moulding, and both sides are connected in parallel, so that the area of the conducting material is doubled and the resistance can be used for greater currents without danger of overheating.

If resistances of very high values are required, they may be produced by employing a very weak solution of "Dag" in insulating varnish instead of water, or by adding some very finely divided non-conducting material, such as colloidal clay, to an aqueous solution of "Dag". Both these methods will give higher resistances than the simple aqueous solution of "Dag".

Obviously, if desired, resistances may be fitted with a plurality, greater than two, of terminals, so that the whole or part of the resistance may be employed as occasion demands.

Obviously also the resistances may be made to any mouldable shape, capable of being coated with conducting medium.

Where a variable high resistance is required, a mould of the form shown in Figures 16 to 22 of the drawings may be employed. This mould comprises three pieces; a base piece or body 50, shown in sectional side elevation in Figure 16, and in plan in Figure 17; a plate and stalk 51, shown in side elevation in Figure 19, and in top and bottom plan respectively in Figures 18 and 20; and a cap 52, shown in sectional side elevation in Figure 21, and in plan in Figure 22.

The piece 50 is bored parallel for a portion of its length, and tapered for another portion, in the manner shown in Figure 16 of the drawings, a pip 53 being left upstanding at the centre of the base of the bore for the purpose of registering the centre of the moulding.

Figure 17:
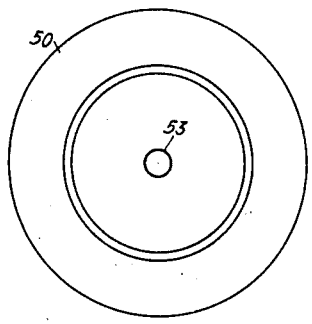
Figure 18:
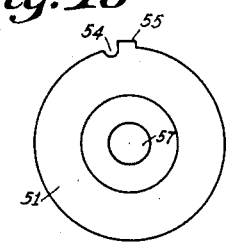

On the edge of the plate of the part 51 is a small depression 54 and a projection 55, while in the centre of the plate is a depression 56. The edge of the plate is tapered as shown in Figure 17 of the drawings and the stalk, which is adapted to be fitted into the central hole of the part 52 is drilled and tapped at 57.

The method of manufacturing a variable grid leak is as follows:—

The surface 58 of the piece 52 is painted with an equeous solution (for example, that known in the trade as "Aquadag") of finely divided graphite, and the said piece 52 is then placed upon a vertical spindle and rotated at a suitable speed. Owing to a centrifugal force, the aqueous solution, while drying, tends to thicken towards the outer edge of the surface 58—an effect which is convenient in adjusting the leak. When the coating upon the surface 58 is dry, the piece 51 is placed in position in the central hole in the piece 52, and the two said pieces pressed together into the piece 50, which has been previously heated and filled with insulating moulding powder. After moulding, the pieces 52 and 51 are withdrawn from the piece 50, if necessary by means of a nut and bolt screwed into the hole 57, and a moulding of the form shown in sectional elevation in Figure 23 of the drawings is then released. It will be seen that the upraised rim 59 of the said moulding is printed with a conductive graphite surface.

Figure 24:
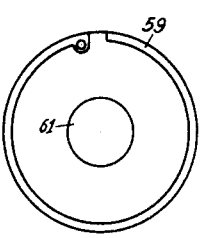
Figure 23:
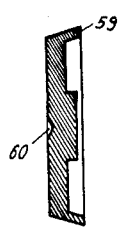

A hole (not shown) is now drilled at the centre 60 and a small hole 61 drilled and tapped, as shown in Figure 24 of the drawings. The hole 61 serves to carry, by means of a set screw, a small metal plate (not shown), which serves as one terminal of the resistance, while a brush, carried upon a radial arm, extending from a spindle mounted in the hole drilled at 60 makes contact with the rim 59. The brush, arm and spindle are not shown in the figure.

The value of the resistance may be raised, if necessary by chamfering off a little of the edge of the graphite coated rim.

Figure 25:
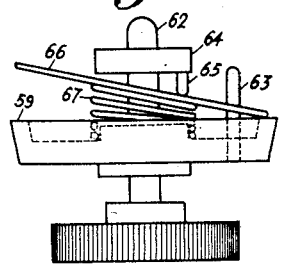
Figure 26:
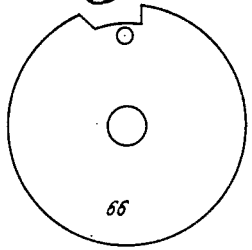

In a modification illustrated in Figures 25 and 26 of the drawings, the rubbing brush is replaced by a metal plate (shown in detail in Figure 26) freely mounted upon the spindle 62 and prevented from rotating by means of a pin 63 screwed into the moulding. Carried upon the spindle 62 and rigid therewith is a collar 64 carrying a pin 65 against which the plate 66 presses under the action of a spring 67. It will be seen that as the spindle is rotated, the plate 66 is caused to make successive contact with every part of the rim 59 in turn, while there is no rubbing action like that which is set up by a brush-wipe contact.

Figure 21:
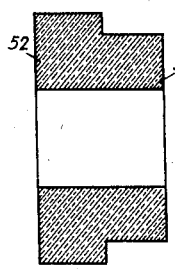
Figure 22:
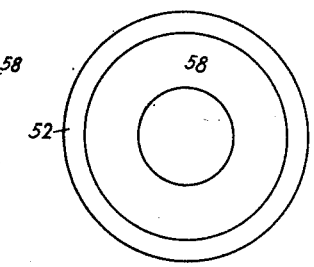

If conductors other than "Dag" are employed in such variable resistances, there is the slight difficulty that there will be no thickening of the conductor at the outer rim of the cap 52, Figure 21.

If a conductor, such as silver deposited on mica, is employed, the following procedure may be followed:—

Figure 19:
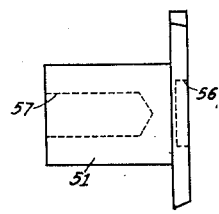
Figure 20:
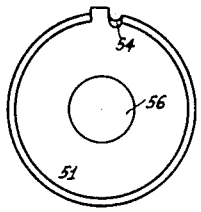

A ring of mica, having an external diameter equal to the diameter of the face 58 of the cap 52, Figure 21, and an internal diameter equal to the diameter of the stalk 51, Figure 19, is made and silver deposited thereon by any well known method.

The silvered mica is now placed on the face 58 of the cap 52, Figure 21, and the stalk 51, Figure 19, is passed through the centre hole. The mica will then be held in position by the cap, Figure 21, and the stalk, Figure 19. The two pieces are now pressed into the piece 50, Figure 16, which has been previously heated and filled with insulating moulding powder. The rest of the operations for moulding and adjusting are now as described above.

It must be understood that although it is preferable during moulding only to mark the position of any holes finally required in the moulding itself, and to drill these holes after moulding, it is quite possible to mould the holes required. For example, if the pip 53 be extended as a cylinder for the required distance, the hole for the centre spindle may be moulded, but this method has the disadvantage that the release of the moulding from the mould is impeded and there is thus danger of breaking the said moulding during withdrawal.

It is found that resistances made in accordance with this invention are very suitable for use in radio and similar circuits, since they are electrically "quiet" in action and do not vary appreciably with any reasonable voltage applied at the terminals.

Satisfactory resistances have been made in the manner described, of value ranging from less than 1,000 ohms to 40 megohms.

Having now particularly described and ascertained the nature of my said invention and in what manner the same is to be performed, I declare that what I claim is:—

1. A method of producing a resistance unit which consists in assembling a predetermined amount of insulating material in a mold of a predetermined shape, providing a coating of finely divided conductive material on a portion of the mold adapted to come in contact with said material, and then subjecting the mold to heat and pressure to mold said insulating material into a solid body and affix said conductive material upon a surface of said body.

2. A method of producing a resistance unit which consists in molding a thermoplastic insulating material into a body shaped in a desired manner, and printing a layer of finely divided conductive material to a desired surface of said body during the molding operation.

3. A method of producing a resistance unit which consists in molding a thermo-plastic insulating material into a body shaped in a desired manner, and printing a layer of finely divided silver upon a desired surface of said body during the molding operation.

THOMAS DIXON PARKIN.